United States Patent
Kermarec et al.

(10) Patent No.: US 9,065,680 B2
(45) Date of Patent: *Jun. 23, 2015

(54) METHODS OF ESTABLISHING VIRTUAL CIRCUITS AND OF PROVIDING A VIRTUAL PRIVATE NETWORK SERVICE THROUGH A SHARED NETWORK, AND PROVIDER EDGE DEVICE FOR SUCH NETWORK

(71) Applicant: RPX Clearinghouse LLC, San Francisco, CA (US)

(72) Inventors: Francois Kermarec, Cagnes sur Mer (FR); Marc Lamberton, Antibes (FR); Michael Tate, Mouans Sartoux (FR); Eric Mouque, Antibes (FR)

(73) Assignee: RPX Clearinghouse LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/219,222

(22) Filed: Mar. 19, 2014

(65) Prior Publication Data

US 2014/0204951 A1 Jul. 24, 2014

Related U.S. Application Data

(63) Continuation of application No. 10/054,207, filed on Jan. 22, 2002, now Pat. No. 8,713,185.

(30) Foreign Application Priority Data

Dec. 7, 2001 (EP) .................................... 01403179

(51) Int. Cl.
*G06F 15/16* (2006.01)
*H04L 12/46* (2006.01)
(Continued)

(52) U.S. Cl.
CPC ........ *H04L 12/4675* (2013.01); *H04L 63/0272* (2013.01); *H04L 63/162* (2013.01); *H04L 12/4645* (2013.01); *H04L 45/502* (2013.01)

(58) Field of Classification Search
CPC .............. H04L 12/2645; H04L 63/162; H04L 63/0272
USPC ........................................................ 709/227
See application file for complete search history.

(56) References Cited

U.S. PATENT DOCUMENTS 5,394,402 A 2/1995 Ross
5,740,171 A 4/1998 Mazzola et al.
(Continued)

OTHER PUBLICATIONS

Request for Comments (RFC) 2764 published in Feb. 2000 by the IETF, "A Framework for IP Based Virtual Private Networks".
(Continued)

*Primary Examiner* — Richard G Keehn
(74) *Attorney, Agent, or Firm* — Barnes & Thornburg LLP

(57) ABSTRACT

A virtual private network (VPN) service is provided through a shared network infrastructure comprising interconnected provider edge (PE) devices having customer edge (CE) interfaces. Some of the CE interfaces are allocated to a VPN supporting virtual LANs. A correspondence between a CE interface and a virtual LAN is learnt on the basis of tagged frames received at this CE interface and including an identifier of this virtual LAN. The learning process permits the detection of pairs of CE interfaces which correspond to a common virtual LAN. Upon such detection, a virtual circuit is established in the shared network infrastructure between the PE devices having these CE interfaces, and subsequently used for forwarding frames including the identifier of the common virtual VLAN.

16 Claims, 3 Drawing Sheets

(51) Int. Cl.
*H04L 29/06* (2006.01)
*H04L 12/723* (2013.01)

(56) References Cited

U.S. PATENT DOCUMENTS

| | | | |
|---|---|---|---|
| 5,825,772 A | 10/1998 | Dobbins et al. | |
| 5,892,912 A | 4/1999 | Suzuki et al. | |
| 5,978,378 A | 11/1999 | Van Seters et al. | |
| 6,249,521 B1 | 6/2001 | Kerstein | |
| 6,337,863 B1 | 1/2002 | Nair et al. | |
| 6,353,596 B1 * | 3/2002 | Grossglauser et al. | 370/256 |
| 6,449,279 B1 | 9/2002 | Belser et al. | |
| 6,535,507 B1 * | 3/2003 | Li et al. | 370/356 |
| 6,560,236 B1 | 5/2003 | Varghese et al. | |
| 6,587,467 B1 * | 7/2003 | Morgenstern et al. | 370/399 |
| 6,633,567 B1 | 10/2003 | Brown | |
| 6,636,516 B1 * | 10/2003 | Yamano | 370/395.52 |
| 6,639,901 B1 * | 10/2003 | Katzri et al. | 370/255 |
| 6,654,347 B1 * | 11/2003 | Wiedeman et al. | 370/241 |
| 6,693,878 B1 * | 2/2004 | Daruwalla et al. | 370/235 |
| 6,701,375 B1 | 3/2004 | Walker et al. | |
| 6,717,944 B1 | 4/2004 | Bryden et al. | |
| 6,757,286 B1 | 6/2004 | Stone | |
| 6,765,914 B1 | 7/2004 | Jain et al. | |
| 6,789,121 B2 * | 9/2004 | Lamberton et al. | 709/227 |
| 6,798,775 B1 | 9/2004 | Bordonaro et al. | |
| 6,912,592 B2 | 6/2005 | Yip | |
| 6,944,159 B1 | 9/2005 | Fotedar et al. | |
| 7,072,346 B2 | 7/2006 | Hama | |
| 7,079,544 B2 | 7/2006 | Wakayama et al. | |
| 7,089,293 B2 | 8/2006 | Grosner et al. | |
| 7,106,747 B2 | 9/2006 | Donaghey | |
| 7,120,683 B2 | 10/2006 | Huang | |
| 7,136,734 B2 | 11/2006 | Durach et al. | |
| 7,222,188 B1 | 5/2007 | Ames et al. | |
| 7,406,518 B2 | 7/2008 | Lasserre | |
| 2001/0030969 A1 | 10/2001 | Donaghey et al. | |
| 2002/0099937 A1 * | 7/2002 | Tuomenoksa | 713/153 |
| 2002/0124107 A1 | 9/2002 | Goodwin | |
| 2003/0048779 A1 * | 3/2003 | Doherty et al. | 370/389 |
| 2003/0108051 A1 * | 6/2003 | Bryden et al. | 370/395.54 |
| 2003/0165117 A1 | 9/2003 | Garcia-Luna-Aceves et al. | |
| 2004/0202157 A1 * | 10/2004 | Chase et al. | 370/389 |

OTHER PUBLICATIONS

Request for Comments (RFC) 3031 published in Jan. 2001 by the IETF, "Multiprotocol Label Switching Architecture".
Internet Draft draft-kompella-ppvpn-l2vpn-01.txt, published in Nov. 2001 by the IETF, "Layer 2 VPNs over Tunnels".
Internet Draft draft-martini-l2circuit-trans-mpls-08.txt, published in Nov. 2001 by the IETF "Transport of Layer 2 Frames Over MPLS".
Request for Comments (RFC) 3036 published in Jan. 2001 by the IETF, "WP Specification".
Request for Comments (RFC) 2205 published in Sep. 1997 by the IETF, "Resource ReSerVation Protocol (.RSVP)".

* cited by examiner

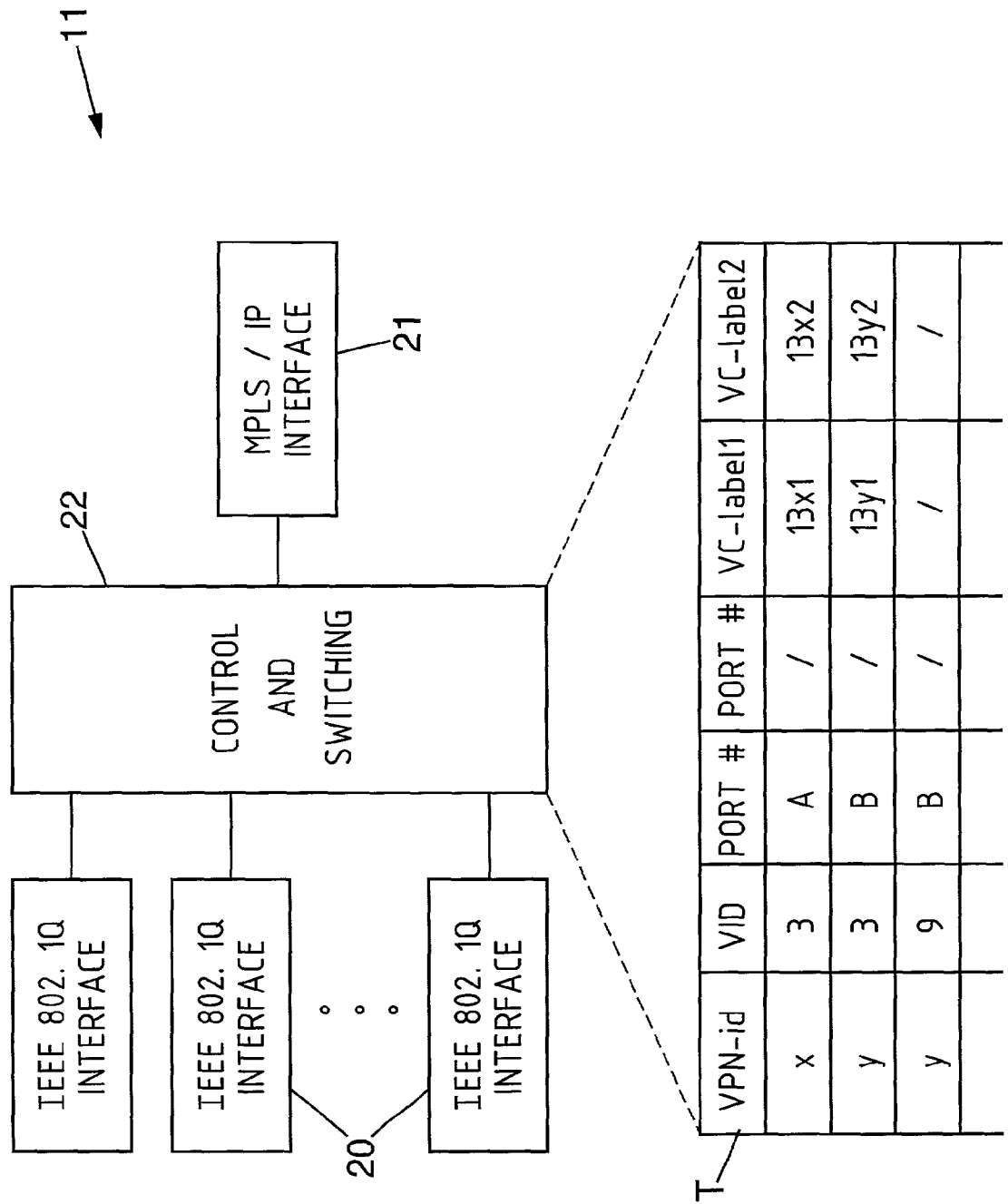

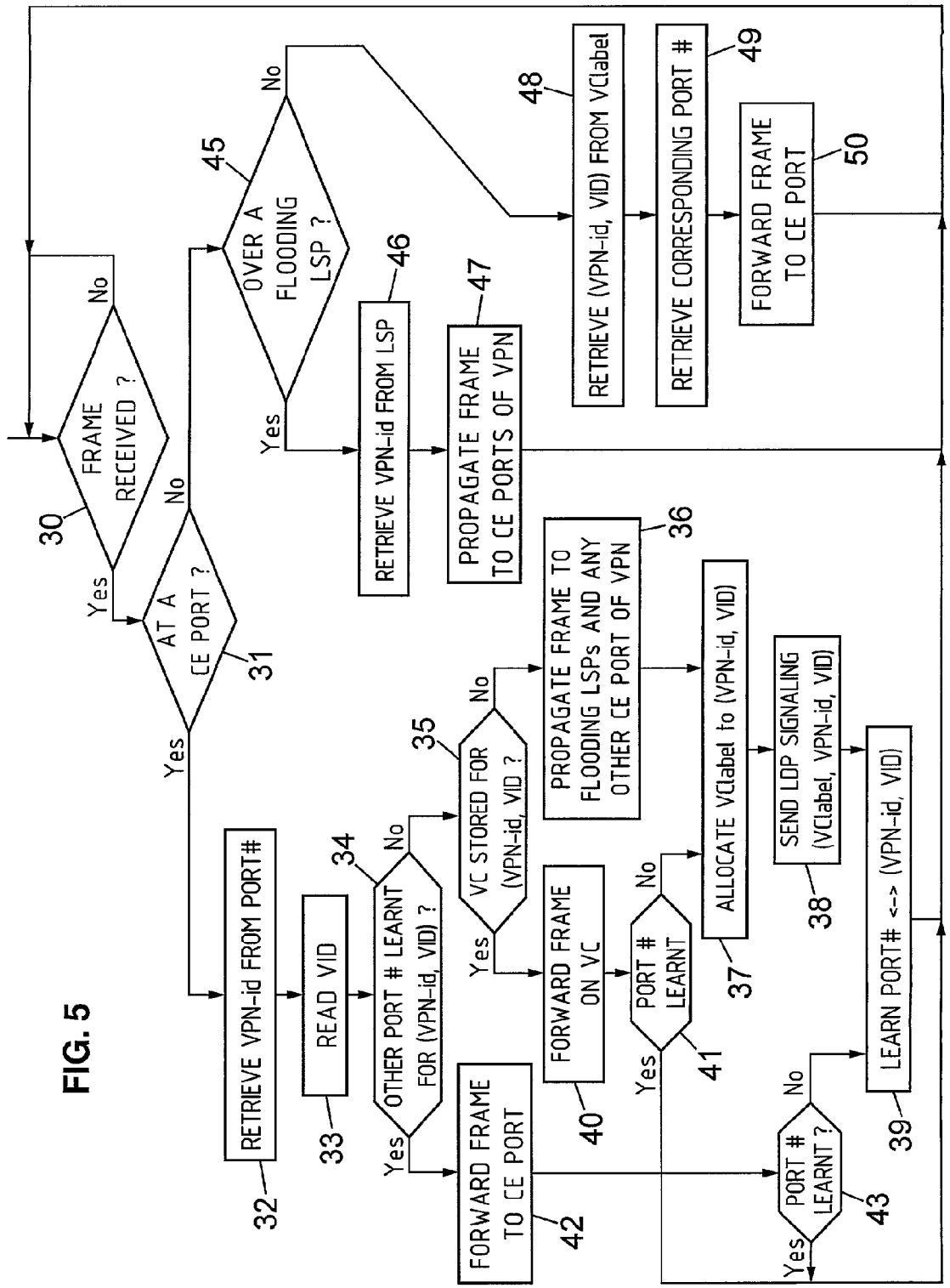

METHODS OF ESTABLISHING VIRTUAL CIRCUITS AND OF PROVIDING A VIRTUAL PRIVATE NETWORK SERVICE THROUGH A SHARED NETWORK, AND PROVIDER EDGE DEVICE FOR SUCH NETWORK

CROSS REFERENCE TO RELATED APPLICATIONS

This application is a Continuation of co-pending U.S. application Ser. No. 10/054,207, filed Jan. 22, 2002, which claims priority to European patent application no. 01403179.3, filed Dec. 7, 2001. The disclosures set forth in the referenced applications are incorporated herein by reference in their entireties.

BACKGROUND OF THE INVENTION

The present invention relates to the provision of virtual private network (VPN) services through carrier networks such as Metropolitan Area Networks (MANs) or Wide Area Networks (WANs).

A VPN emulates a private network over public or shared infrastructures. When the shared infrastructure is an IP network such as the Internet, the VPN can be based on an IP tunneling mechanism, as described in Request For Comments (RFC) 2764 published in February 2000 by the Internet Engineering Task Force (IETF). Another approach, more particularly concerned by the present invention, provides link layer connectivity for the devices affiliated to the VPN.

Traditional WAN data layer 2 services provided by carriers are based on the virtual circuit concept. Data units are switched within the carrier network along pre-established trails referred to as virtual circuits. These data units are for instance packets in X.25 networks, frames in Frame Relay (FR) networks, cells in Asynchronous Transfer Mode (ATM) networks, . . . The carrier network may also have a Multi-Protocol Label Switching (MPLS) architecture built over an infrastructure supporting a connectionless network layer protocol such as IP. MPLS is described in RFC 3031 published in January 2001 by the IETF. The virtual circuits within a MPLS network are referred to as Label Switched Paths (LSPs).

The virtual circuits can be pre-established by a configuration process, called "provisioning," performed by the network operator: they are then called Permanent Virtual Circuits (PVC). Alternatively, they can be established dynamically on request from the customer equipment: they are then called Switched Virtual Circuits (SVC).

Providing a SVC service puts constraints on both the Provider Edge (PE) and the Customer Edge (CE) devices. Both must support a common signaling set-up protocol such as, e.g., the ATM Q.2931 signaling protocol for ATM switched networks. Signaling protocols are complex, they induce additional costs (equipment costs, operational costs . . . ) and they may cause interoperability problems. Inadequate operation of one CE may block a PE and hence interrupt the service for several other customers. Most of the time, higher-level protocols and applications have not been designed to properly drive such SVC signaling, and it is necessary to develop sub-optimal emulation modes (for instance LAN emulation, classical IP, . . . ). These issues can explain why SVC services have been so seldom deployed for FR and ATM networks.

On the other hand, providing a PVC service requires an agreement between the provider and the customer regarding the endpoints of each virtual circuit. Then it requires provisioning of each virtual circuit by the provider. Often, it also requires additional provisioning by the customer in the CE device, unless some special signaling allows CE devices to automatically discover the virtual circuits. In any case, these provisioning actions must be performed coherently between the provider and his customers, and they are a potential source of problems.

Recently, several vendors have been promoting Ethernet as a universal access media for LAN, MAN and WAN services. Several drafts presented at the IETF cover the way to signal and provision layer 2 virtual private network (L2 VPN) services based on an IP/MPLS infrastructure (see, e.g., Kompella et al., "MPLS-based Layer 2 VPNs", Internet Draft, draft-kompella-ppvpn-l2vpn-00.txt, published in June 2001 by the IETF).

As specified in the IEEE standard 802.1Q approved in December 1998, Ethernet networks may support one or more Virtual Local Area Networks (VLANs). An Ethernet frame circulating in such a network may include, after the Medium Access Control (MAC) address, an additional field called tag header or Q-tag which contains a VLAN identifier (VID). Accordingly, a VLAN-aware Ethernet bridge has the ability to perform frame switching based on the VID, deduced either from the physical port from which the incoming frame is received or from the contents of its tag header. A VLAN is used for the layer 2 broadcasting and forwarding of frames within a sub-group of users (subscribers of that VLAN). For example, in a corporation, it is possible to define respective virtual LANs for various departments to enable selective broadcasting and forwarding of information in the layer 2 procedures.

It has been suggested that the concept of VLAN can be extended in the case where Ethernet traffic is transported over a MPLS network (see, e.g., Martini et al., "Transport of Layer 2 Frames Over MPLS", Internet Draft, draft-martini-l2circuit-trans-mpls-07.txt, published in July 2001 by the IETF).

In such a case, a specific MPLS virtual circuit, or LSP, originating at a PE can be associated with each VLAN to forward the frames intended for subscribers of that VLAN. The CE sends tagged frames to the PE and the latter switches them to the relevant virtual circuits based on the ingress physical port and the VID.

It should be noted that this port/VID switching mechanism will achieve the full functionality of a IEEE 802.1Q network on the condition that the different hosts pertaining to any given VLAN of a VPN are not linked to the carrier network through more than two PE/CE interfaces. Otherwise, VLAN identification is not sufficient for the source PE to determine which is the destination PE or CE, i.e. whether a virtual circuit or physical port is to be used. When such constraint exists on the VLAN topology, the VPN service provided by the carrier can be referred to as a "virtual connection" or "point-to-multipoint" service.

Other types of VPN service do not rely on such port/VID switching at the PEs. For example, a full VLAN service (supporting more than two PE/CE interfaces per VLAN within a VPN) can be provided if the PEs are capable of performing MAC address learning and switching, like an Ethernet bridge. However, this is rather complex because the carrier has to store and maintain tables at the PEs, for associating a virtual circuit or physical port to any Ethernet MAC address found in a frame coming from the CE.

Because Ethernet media were designed from the beginning as a LAN technology, they do not provide the signaling mechanisms required for WAN SVC networks. So establishing Ethernet PVC across a WAN network requires provisioning in both PE and CE devices.

An object of the present invention is to alleviate these provisioning issues.

Another object is to provide for dynamic establishment of Ethernet-like SVCs without any signaling between CE and PE devices.

Another object is to provide an Ethernet-like VPN service of the virtual connection type without requiring changes in the CE devices. These devices should advantageously use regular Ethernet adapters, the upper layer protocols and applications remaining unchanged.

SUMMARY OF THE INVENTION

According to a first aspect, the invention proposes method of establishing a virtual circuit including at least one PE device for a virtual private network having a plurality of CE devices. This method comprises the steps of:

receiving, at a first said PE device, an indication from at least one said CE device identifying a VLAN which includes said CE device; and establishing, for each VLAN identified which includes a plurality of CE devices in which at least one said CE device is connected to a second PE device, a virtual circuit between said first and second PE devices.

In another aspect of the invention, a VPN service can be provided through a shared network infrastructure comprising a plurality of interconnected PE devices having CE interfaces. Some of the CE interfaces are allocated to a VPN supporting a plurality of VLANs and are arranged for exchanging tagged data frames with CE devices respectively connected to the PE devices through said CE interfaces, each tagged frame including a VLAN identifier. The method comprises the following steps:

receiving at least one tagged frame from a CE device at each CE interface allocated to said VPN, and learning a correspondence between said CE interface and each VLAN identifier included in said at least one tagged frame;

detecting whether a pair of CE interfaces allocated to said VPN and belonging to two PE devices correspond to a common VLAN identifier; and in response to such detection, establishing at least one virtual circuit in the shared network infrastructure between the two PE devices, for forwarding frames including said common VLAN identifier.

The VPN typically has a topology such that at most two of its allocated CE interfaces are allowed to receive tagged frames including a given VLAN identifier. In this context, the invention provides a way to automatically establish a set of point-to-multipoint connections in a given VPN. Connection establishment is triggered by the data received from the customer equipment.

The PE device learns the VLAN-id in the frames received from the customer devices and automatically signals the establishment of per VLAN-id virtual circuits (VCs) between PE devices.

In a preferred embodiment of the invention, the VCs are labeled switched paths of a MPLS architecture supported by the shared network infrastructure. A VC is then identified by a VC-label, which simplifies the provisioning and management on the PE device. However, other types of carrier networks can be used to provide a L2 VPN service in accordance with the invention, e.g. frame relay, ATM, X.25, etc.

The PE device looks at the VLAN-id (VID) of frames coming from each CE device. When a new VID is observed, the frame is preferably flooded to every PE device concerned by the VPN, and then to every CE interface allocated to that VPN. The ingress PE device learns, in a VLAN learning table that the source CE device is now using that VID. The ingress PE also signals to every other PE device a tuple (VC-label, VPN-id, VID) bound to the CE interface where that CE device is connected. If another PE device in the shared network has a CE interface allocated to the same VPN and using the same VID, it will accept the VC-label, and signal back another VC-label with (VPN-id, VID), bound to the latter CE interface. The VC is then established in both directions.

Such dynamic setup of VCs by means of VLAN information directly learnt from customer data frames has the significant advantage of requiring no provisioning at the VC endpoints (PEs), in particular no configuration relating to the VID values. As a result, no agreement is required between customer and provider regarding VC endpoints locations and addresses. The same dynamicity as a SVC call setup mechanism is achieved: the customer can have a new carrier VC set up at any time by starting a new VLAN in two CE devices. No notification to the provider is required. There are also fewer risks to do provisioning errors. In addition, no specific signaling is required at the CE devices. A VC can be automatically released by a PE device when not used, without requiring upper layer action, in response to the observation that a CE device does not use a VID any more for a certain time.

Another aspect of the invention relates to a PE device comprising means for communicating with other PE devices, at least one CE interface, configuration means for allocating at least one CE interface to a VPN supporting a plurality of VLANs, means for mapping a VLAN to a CE interface allocated to the VPN, said VLAN being indicated in data received at said CE interface, means for identifying, in relation to the indicated VLAN, another PE device having a CE interface allocated to the VPN, and means for establishing a virtual circuit to the identified PE device.

Another aspect of the invention relates to a PE device suitable for implementing the above method of providing a VPN service through a shared network infrastructure, comprising:

means for communicating with other PE devices through the shared network infrastructure;

at least one local CE interface;

configuration means for allocating at least one local CE interface to a VPN supporting a plurality of VLANs, the allocated local CE interface being arranged for exchanging tagged data frames with a respective CE device, each tagged frame including a VLAN identifier;

means for learning a correspondence between a first local CE interface allocated to said VPN and a first VLAN identifier included in at least one tagged frame received from a CE device at said first local CE interface;

means for identifying another PE device having a CE interface allocated to said VPN and having received a tagged frame including said first VLAN identifier; and means for establishing a virtual circuit in the shared network infrastructure, for communicating frames including said first VLAN identifier with the identified PE device.

The preferred features of the above aspects which are indicated by the dependent claims may be combined as appropriate, and may be combined with any of the above aspects of the invention, as would be apparent to a person skilled in the art.

BRIEF DESCRIPTION OF THE DRAWINGS

FIG. 4 is a block diagram of a provider edge device according to the invention.

FIG. 5 is a flow chart of a frame handling procedure which can be used in the provider edge device of FIG. 4 in an embodiment of the invention.

DESCRIPTION OF PREFERRED EMBODIMENTS

The invention is illustrated here in its currently preferred application to a VPN service of the Ethernet type using a MPLS-based carrier infrastructure. It will be appreciated that it can also be applied to other types of customer and/or provider networks.

Figure 1:
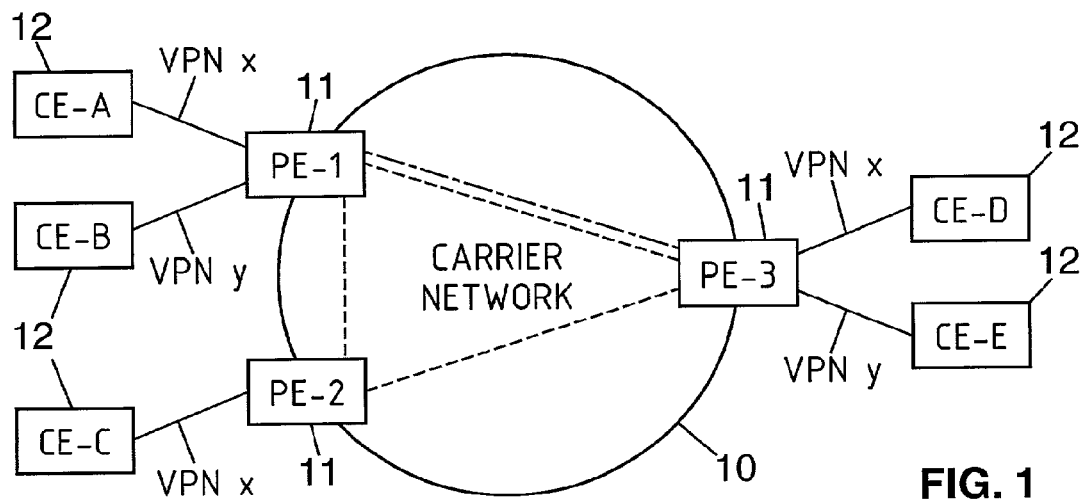
FIG. 1-3 are diagrams of a simplified example of virtual private networks making use of resources of a carrier network.
Figure 2:
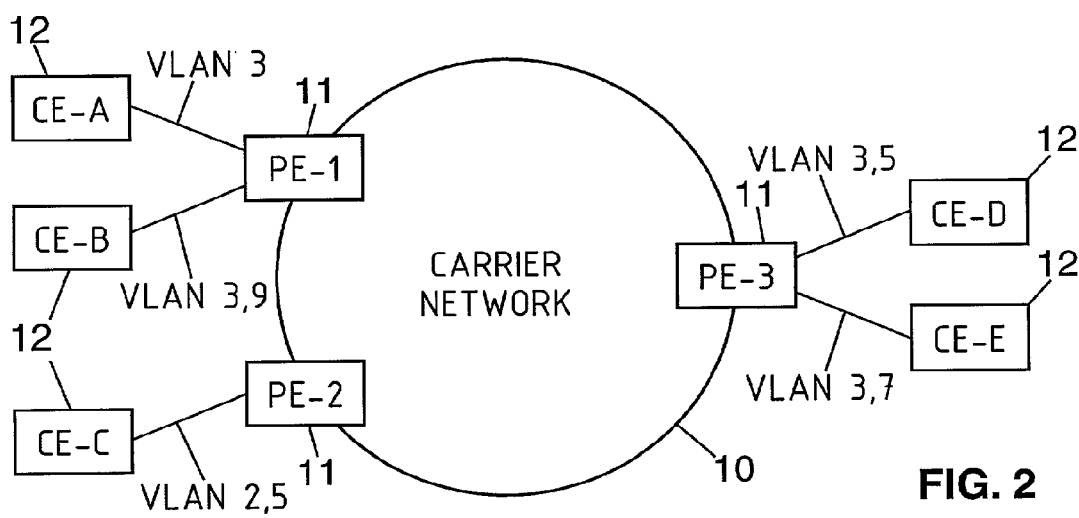
Figure 3:
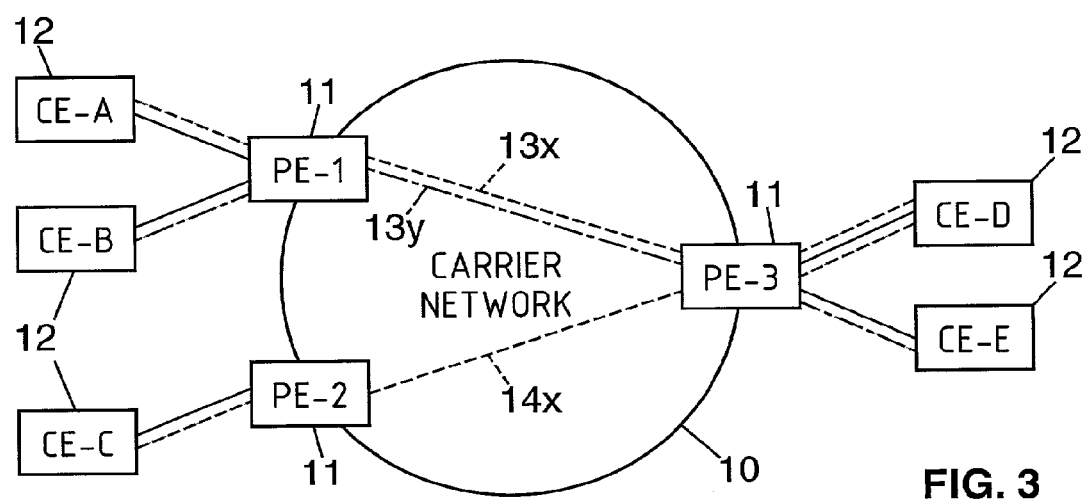

The carrier network 10 shown in FIG. 1-3 is for instance an IP network having routers supporting the MPLS architecture. Some of these routers 11 are label edge routers (LERs) adapted to form PE devices for the provision of the L2 VPN service. They are denoted PE-1 to PE-3 in the diagram of FIG. 1-3. Other routers (not shown) of the carrier network 10 are label-switched routers (LSRs) which link the LERs by a full mesh of logical links (transport tunnels).

Each PE device 11 is initially configured by the provider with the list of the IP addresses of all the remote PE devices. Each PE device then establishes a transport LSP to each remote PE. This can be done through any signaling protocol suitable to set up LSPs, such as LDP (Label Distribution Protocol, see RFC 3036 published in January 2001 by the IETF), RSVP (Resource reSerVation Protocol, see RFC 2205 published in September 1997 by the IETF), etc. LDP will be more particularly considered in the following.

FIG. 1-3 also show customer edge devices 12 that are each connected to a respective CE port of a PE device 11. These CE devices 12 are denoted CE-A to CE-E, with CE-A and CE-B connected to PE-1, CE-C connected to PE-2, and CE-D and CE-E connected to PE-3. We assume here that the CE devices are supporting VLANs and are using tagged traffic compliant with the IEEE 802.1Q standard. Untagged traffic is assigned to the default VID=0. We also assume that at most two CEs per VPN are allowed to use a same VLAN identifier.

FIG. 4 shows the CE interfaces 20 of a PE device 11, as well as its IP/MPLS interface 21 by which it is connected to one or more LSR of the carrier network. A control and switching module 22 cooperating with these interfaces 20, 21 is programmed to implement the VPN service as explained hereafter.

In each PE device, the service provider configures the VPN-id of each CE interface, or port, offering a L2 VPN service. Each local port number is then allocated to one VPN-id.

After this configuration step, each PE device 11 distributes VC labels per VPN to the other PE devices. This can be signaled through LDP. These VC-labels per VPN will be used to flood frames within a VPN. The corresponding LSPs, established between each pair of PE devices having at least one CE port allocated to a given VPN, can thus be referred to as flooding VCs.

Once these flooding VCs have been established, the L2 VPN service can be started. No additional configuration will be needed in the carrier network.

FIG. 1 shows an example with two customer VPNs, having VPN-id=x and VPN-id=y. VPN x includes CE devices CE-A, CE-C and CE-D. VPN y includes CE devices CE-A and CE-E. The dashed lines illustrate the flooding VCs established for VPN x, while the dash-and-dot lines illustrate the flooding VCs established for VPN y.

The distribution of the VLANs is then learnt at the PE devices based on the VIDs included in the tagged frames received from the CE devices.

In each PE, the control and switching module 22 learns a lookup table T which is subsequently used to retrieve the VCs and CE ports corresponding to the different VLANs of a VPN. An entry in table T has a VPN-id and a VID corresponding to a VLAN, and identifies communication resources in association therewith. These communication resources can be two local CE port numbers if the VLAN has its two CE devices connected to the same PE device. If the VLAN has a CE device connected to a local port and another CE device connected to a remote PE device, the resources stored in table T comprise a local CE port number and a VC established in the carrier networks, with a VC label for sending frames to the remote PE and another VC label for receiving frames from the remote PE.

FIG. 2 shows an exemplary distribution of VLAN identifiers which may be found in the frames received at the CE ports in the configuration of FIG. 1 (in this example, there is one CE device for (VPN-id, VID)=(x, 2), (y, 7) or (y, 9), and two CE devices for (VPN-id, VID)=(x, 3), (x, 5) or (y, 3)).

FIG. 3 shows the corresponding VCs to be established in the carrier network: VC 13x between PE-1 and PE-3 for communication of tagged frames of VPN x with VID=3 between CE-A and CE-D; VC 14x between PE-2 and PE-3 for communication of tagged frames of VPN x with VID=5 between CE-C and CE-D; and VC 13y between PE-1 and PE-3 for communication of tagged frames of VPN y with VID=3 between CE-A and CE-E. The corresponding content of table T in PE-1 is shown in FIG. 4 where 13x1 and 13x2 (13y1 and 13y2) denote the VC-labels used in the two directions on VC 13x (13y).

FIG. 5 illustrates a procedure which may be used by the control and switching module 22 of a PE device to process an Ethernet frame received by that PE device.

When the frame is received at a local CE port (yes in tests 30 and 31), the corresponding VPN-id is retrieved in step 32 based on the configuration of the port number, and the VLAN identifier is read in the tag header of the frame in step 33. If table T contains no other local port number and no VC label for forwarding the frame (no in tests 34 and 35), then the frame is propagated to all the other PE devices in step 36 by pushing the labels of the flooding LSPs previously established. In this step 36, the frame is also propagated to any other local CE port of the PE device which has been configured for the VPN-id retrieved in step 32. The PE device also allocates a VC label to the (VPN-id, VID) pair in view of the reception of frames through the carrier network, and stores it in table T (step 37). In step 38, the allocated VC label is sent, along with VPN-id and VID, to all the other PEs configured for the VPN. This can be done by means of a LDP message (see the Internet Draft "draft-martini-l2circuit-trans-mpls-07.txt"). An entry is created in table T in step 39 to learn the relationship between the CE port number and the (VPN-id, VID) pair. The PE device can then wait for the next Ethernet frame (return to test 30).

A PE device receiving such LDP signaling message stores the indicated VC label in its table T in view of forwarding any frame of the identified VPN coming from one of its local CE ports with the same VID in the tag header. When such a frame is received from a local CE port, a VC label is already stored in table T for the relevant (VPN-id, VID) pair, so that test 35 is positive. The frame is thus forwarded on the VC in step 40 by pushing the VC label retrieved from table T. If it is the first frame received with that VID on that local CE port, the latter has not yet been learnt (test 41 is negative): it is then detected that two CE ports correspond to the relevant (VPN-id, VID) pair. It is necessary to allocate a VC label for the other direction and to send it back by LDP signaling. This is done in the above-described steps 37 and 38 (except that in step 38 the LDP message is a response to the previous LDP message and can thus be sent only to the PE from which it came). The relationship between the local CE port number and the (VPN-id, VID) pair is finally learnt in step 39. When test 41 is positive, nothing else need to be done since the VC is already established.

If test 34 is positive, the VLAN has its two CE devices connected to the same PE device. The incoming frame is then forwarded to the other relevant local CE port identified by means of table T (step 42). If the port number of the incoming frame has already been learnt (test 43 positive), the procedure returns to test 30 to wait for the next frame. If it has not yet been learnt, this is done in step 39 before returning to test 30.

The right part of FIG. 5 deals with the reception of Ethernet frame at a PE device through the carrier network (test 31 negative).

If the frame was received over a flooding LSP from another PE (test 45 positive), the popped VC label of that flooding LSP enables the retrieval of the VPN-id in step 46. The frame is then propagated by the PE device to each local CE port configured for the retrieved VPN-id (step 47), and the PE waits for a responding frame.

If the frame was received over a unicast VC, the VPN-id and the VID are retrieved in table T by means of the popped VC label of that unicast LSP (step 48), as well as the corresponding local port number (step 49). The frame is then forwarded to that local CE port in step 50.

In practice, the learning stage will normally be very quick. Typically, the first frame received at a PE for a VPN/VLAN will be carry a SYN segment of the transmission control protocol (TCP). This first frame will be forwarded to the other PEs configured for the VPN, along with the VC label distribution (path 30-31-32-33-34-35-36-37-38-39 in FIG. 5), and from there to the various CE devices of the VPN (path 30-31-45-46-47). One of them will obtain a response carrying the TCP SYN ACK segment which will be forwarded back to the first PE while distributing the VC label for the other direction (path 30-31-32-33-34-35-40-41-37-38-39). The learning and signaling operations are then finished for the VC. The first PE simply forwards the response frame to the source CE device (path 30-31-45-48-49-50).

An entry of the lookup table T may become obsolete if a CE device does not use a VID any more for a period of time. This is easily detected at the PE by means of a timer. When it happens, the PE device may simply delete the entry. This is equivalent to a VC disconnection procedure.

A PE device may further be programmed to generate an alarm whenever it detects that more than two CE interfaces transport user traffic pertaining to the same VLAN. This would typically occur when more than one LDP response messages are received for a (VPN-id, VID) pair at the PE that first sent a LDP message for that pair (step 38). Such alarm indicates that the customer has not complied with the VLAN topology for which the VPN operates.

The text of the abstract repeated below is hereby deemed incorporated in the description:

A VPN service is provided through a shared network infrastructure comprising interconnected PE devices having CE interfaces. Some of the CE interfaces are allocated to a VPN supporting virtual LANs. A correspondence between a CE interface and a virtual LAN is learnt on the basis of tagged frames received at this CE interface and including an identifier of this virtual LAN. The learning process permits the detection of pairs of CE interfaces which correspond to a common virtual LAN. Upon such detection, a virtual circuit is established in the shared network infrastructure between the PE devices having these CE interfaces, and subsequently used for forwarding frames including the identifier of the common virtual VLAN.

We claim:

1. A provider edge (PE) device for a shared network infrastructure, comprising:
   at least one network interface configured for communication with other PE devices through the shared network infrastructure;
   at least one local customer edge (CE) interface;
   at least one controller coupled to the at least one network interface and the at least one CE interface and configured:
   to allocate at least one local CE interface to a Layer 2 Virtual Private Network (VPN) supporting a plurality of virtual local area networks (VLANs), the allocated local CE interface being arranged for exchanging tagged data frames with a respective CE device, each tagged frame including a VLAN identifier;
   to learn a correspondence between a first local CE interface allocated to the Layer 2 VPN and a first VLAN identifier included in at least one tagged frame received from a CE device at the first local CE interface;
   to identify another PE device having a CE interface allocated to the Layer 2 VPN and having received a tagged frame including the first VLAN identifier; and
   to establish a virtual circuit in the shared network infrastructure, for communicating frames including the first VLAN identifier with the identified PE device.

2. The PE device of claim 1, wherein the at least one controller is configured:
   to establish a respective flooding virtual circuit in the shared network infrastructure to each other PE device configured to have at least one CE interface allocated to the Layer 2 VPN; and
   responsive to reception of a first tagged frame including the first VLAN identifier at the first local CE interface, to propagate the first tagged frame on each of the flooding virtual circuits established to the other PE devices.

3. The PE device of claim 2, wherein the at least one controller is configured, responsive to reception, from another PE device configured to have at least one CE interface allocated to the Layer 2 VPN, of a tagged frame including a VLAN identifier for which no CE interface has been learnt, to propagate the tagged frame through any local CE interface allocated to the Layer 2 VPN.

4. The PE device of claim 2, wherein the at least one controller is configured to store the correspondence between the first local CE interface and the first VLAN identifier in response to the reception of the first tagged frame at the first local CE interface.

5. The PE device of claim 2, wherein the at least one controller is configured:
   to allocate a first virtual circuit resource for the Layer 2 VPN and first Layer 2 VLAN identifier in response to the reception of the first tagged frame at the first local CE interface;
   to transmit a first signaling message to each other PE device of the shared network infrastructure configured to have at least one CE interface allocated to the Layer 2 VPN, the first signaling message indicating the first virtual circuit resource and the Layer 2 VPN and first VLAN identifier.

6. The PE device of claim 5, wherein the at least one controller is responsive to reception from the other PE device of a second signaling message indicating a second virtual circuit resource, the Layer 2 VPN and first VLAN identifier, whereby frames including the first VLAN identifier and received at the first CE interface are forwarded to the identified PE device on a virtual circuit via of the second virtual circuit resource.

7. The PE device of claim 6, wherein the first and second virtual circuit resources are labels of a multi-protocol label switching architecture of the shared network infrastructure.

8. The PE device of claim 6, wherein the first and second signaling messages are in accordance with a label distribution protocol supported by the multi-protocol label switching architecture.

9. The PE device of claim 1, wherein the Layer 2 VPN has a topology such that at most two CE interfaces allocated thereto are allowed to receive tagged frames including a given VLAN identifier.

10. The PE device of claim 1, wherein each CE interface allocated to the Layer 2 VPN is an Ethernet interface.

11. The PE device of claim 1, wherein the at least one controller is configured to maintain at least one table associating respective virtual circuits and respective CE ports to respective VLANs of the VPN.

12. The PE device of in claim 1, wherein each CE interface allocated to the VPN is configured to exchange data frames with a respective CE device, each data frame including a VLAN identifier.

13. The PE device of claim 1, wherein the virtual circuit is configured to communicate frames comprising a VLAN identifier.

14. The PE device of claim 1, wherein the at least one network interface is an MPLS/IP interface.

15. The PE device of claim 1, wherein the at least one customer interface is an Ethernet interface.

16. The PE device of claim 15, wherein the at least one customer interface is an IEEE 802.1Q interface.

\* \* \* \* \*